(12) United States Patent
Gilstad et al.

(10) Patent No.: US 8,550,425 B1
(45) Date of Patent: Oct. 8, 2013

(54) IMPULSE TOLERANT VALVE ASSEMBLY

(76) Inventors: Dennis W. Gilstad, San Antonio, TX (US); Barbara C. Gilstad, San Antonio, TX (US)

( * ) Notice: Subject to any disclaimer, the term of this patent is extended or adjusted under 35 U.S.C. 154(b) by 0 days.

(21) Appl. No.: 13/525,374

(22) Filed: Jun. 18, 2012

Related U.S. Application Data

(63) Continuation-in-part of application No. 13/228,475, filed on Sep. 9, 2011.

(51) Int. Cl.
*F16K 31/00* (2006.01)

(52) U.S. Cl.
USPC ............... 251/64; 251/80; 251/318; 251/367; 137/516.29; 137/902

(58) Field of Classification Search
USPC ........... 251/332, 356–358, 366–367, 318, 12, 251/48, 77, 80, 120, 334, 64; 137/516.29, 137/902
See application file for complete search history.

(56) References Cited

U.S. PATENT DOCUMENTS

| | | | |
|---|---|---|---|
| 5,091,455 A | | 2/1992 | Blank et al. |
| 5,158,162 A | | 10/1992 | Fink et al. |
| 5,238,744 A | | 8/1993 | Williams et al. |
| 5,507,477 A | * | 4/1996 | Manning et al. ........... 267/140.3 |
| 5,670,006 A | | 9/1997 | Wilfong et al. |
| 5,979,242 A | | 11/1999 | Hobbs |
| 6,026,776 A | | 2/2000 | Winberg |
| 6,293,514 B1 | * | 9/2001 | Pechoux et al. .............. 251/122 |
| 6,331,578 B1 | | 12/2001 | Turner et al. |
| 6,432,320 B1 | | 8/2002 | Bonsignore et al. |
| 7,222,837 B1 | | 5/2007 | Blume |
| 7,429,220 B2 | | 9/2008 | Kuntimaddi et al. |
| 7,513,483 B1 | | 4/2009 | Blume |
| 7,513,759 B1 | | 4/2009 | Blume |
| 7,847,057 B2 | | 12/2010 | Muller et al. |
| 2005/0084229 A1 | * | 4/2005 | Babbitt et al. ................ 385/146 |
| 2010/0072413 A1 | * | 3/2010 | Koyomogi .................... 251/366 |
| 2012/0136356 A1 | * | 5/2012 | Doherty et al. ................. 606/62 |
| 2013/0019955 A1 | * | 1/2013 | Bagagli et al. ................. 137/12 |

OTHER PUBLICATIONS

Introduction to Impulse Hammers, Internet download Sep. 2011 from Dytran Instruments, Inc.

* cited by examiner

*Primary Examiner* — John K Fristoe, Jr.
*Assistant Examiner* — Marina Tietjen
(74) *Attorney, Agent, or Firm* — Dennis W. Gilstad

(57) ABSTRACT

An impulse tolerant valve assembly comprises a valve body having a longitudinal axis and a central internal cavity, the cavity enclosing a nonlinear spring-mass damper optionally immersed in a dilatant liquid. The central internal cavity is enclosed by a proximal valve body portion and a distal elastic valve body base plate, the base plate having a peripheral valve seat interface. Impulse tolerance results in part from hysteresis heat loss due to compliance of the elastic valve body base plate, as well as from heat loss associated with operation of the nonlinear spring-mass damper. The combined heat loss is reflected in reduction of closing energy impulse amplitude and damping of induced valve body vibrations. Compliance of the elastic valve body base plate increases closing energy impulse duration and narrows the corresponding induced vibration spectrum. The valve body has at least one guide and at least one peripheral seal-retention groove.

7 Claims, 3 Drawing Sheets

IMPULSE TOLERANT VALVE ASSEMBLY

This application is a continuation-in-part of copending application Ser. No. 13/228,475 filed 9 Sep. 2011, incorporated by reference.

FIELD OF THE INVENTION

The invention relates generally to reciprocating high-pressure pumps, and more specifically to the valves of such pumps.

BACKGROUND

Reciprocating high-pressure pumps used in oil and gas fields, particularly those intended for fracking, are usually designed in two sections. The (proximal) power section (herein "power end") and the (distal) fluid section (herein "fluid end") are often truck-mounted for easy relocation from well-to-well. The fluid end comprises a housing incorporating one or more functional units, each functional unit typically comprising a suction valve, a discharge valve, and a plunger or piston bore in which a reciprocating plunger or piston alternately produces suction strokes and pressure strokes. Such pumps are being operated at unprecedented peak pumped-fluid pressures in current practice (e.g., up to about 15,000 psi), while simultaneously being weight-limited due to the carrying capacity of the trucks on which they are mounted.

Due to high peak pumped-fluid pressures, suction valves experience wide pressure variations between a suction stroke, when the valve opens, and a pressure stroke, when the valve closes. For example, during a pressure stroke a valve body may be driven toward contact with its corresponding valve seat with total valve closing force from about 50,000 to over 150,000 pounds (depending on pumped-fluid pressure and valve body area); the closing force is applied longitudinally to the proximal surfaces of the valve. Actual valve closure impact occurs with metal-to-metal contact between the valve body's valve seat interface and the valve seat itself.

Valve closure impact is particularly prominent when a conventionally-stiff valve body contacts a conventional frusto-conical valve seat. The valve body's longitudinal movement typically stops abruptly, together with the associated longitudinal movement of a proximal mass of pressurized fluid in contact with the valve body. The kinetic energy of the moving valve body and pressurized fluid is thus nearly instantly converted to a high-amplitude closing energy impulse of short duration. The effect may be compared to that of a commercially-available impulse hammer configured to produce broad-spectrum high-frequency excitation (i.e., vibration) in an object struck by the hammer.

Thus, broad-spectrum high-frequency vibration characteristically results from the closing energy impulse of a conventionally-stiff valve body contacting a conventional frusto-conical valve seat. This vibration is quickly transmitted via the valve seat to adjacent areas of the pump housing, where it can be expected to excite damaging resonances within adjacent pump housing structures. See, e.g., U.S. Pat. No. 5,979,242, incorporated by reference.

Pump housing resonances are especially problematical in the presence of corrosive components of the pumped fluid. Unsurprisingly, maintenance costs are known in the well-service industry to be relatively high and rising. Common failure modes include both rapid valve wear and the early emergence of structurally significant corrosion fatigue cracks in the pump housing. Thus, increasing attention has been directed to the prominent-but-insidious role of vibration-induced corrosion fatigue. This mechanism has also been cited in analyses of well-publicized and unanticipated structural failures of important bridges.

Proposed valve designs in the past have included relatively lighter valve bodies comprising one or a plurality of interior cavities. See, e.g., U.S. Pat. No. 7,222,837 B1, incorporated by reference. Notwithstanding the somewhat lower closing energy impulse amplitudes theoretically associated with such lighter valve bodies, they have been less popular than heavier and substantially more rigid valve bodies. The latter valve bodies have historically been relatively durable, but that performance record was largely created in lower pressure applications where the vibration issues described above are less prominent.

Problems evident during the present transition from lower pressure pump operations to higher pressures might be analogous in part to issues associated with the transition from slow-turning two-cylinder automobile engines to higher-speed and higher-powered inline six-cylinder engines. The latter transition took place around the years 1903-1910, and the new engine failure modes which became evident were neither anticipated nor understood at the time. Whereas earlier engines had been under-powered but relatively reliable, torsional crankshaft vibrations in the six-cylinder engines caused objectionable noise and vibration ("octaves of chatter from the quivering crankshaft"), as well as unexpected catastrophic failures (e.g., broken crankshafts). (Quotation cited on p. 13 of *Royce and the Vibration Damper*, Rolls-Royce Heritage Trust, 2003). The vibration problems, though never entirely eliminated, were finally reduced to manageable levels after several crankshaft redesigns and the development of crankshaft vibration dampers by Royce and Lanchester. Analogously, new valve designs directed to reducing the above-described adverse vibration-related effects are needed now.

SUMMARY OF THE INVENTION

An impulse tolerant valve assembly comprises a valve body having a longitudinal axis and a central internal cavity, the cavity enclosing a nonlinear spring-mass damper which may be immersed in a dilatant liquid (sometimes termed a shear-thickening liquid). When present, the dilatant liquid facilitates tuning the damper to a plurality of predetermined frequencies to effectively reduce "ringing" (i.e., vibration) of the valve body induced by a valve closing energy impulse. Further, the dilatant liquid tends to prevent "bottoming" of the damper's mass during the sudden valve body deceleration associated with a closing energy impulse. These two functions act to reduce the vibration energy transmitted to a pump housing via the valve seat of an individual valve.

For illustrative purposes, the Figures herein show a valve body's central internal cavity which is substantially enclosed by a proximal valve body portion and a distal elastic valve body base plate. The Figures are schematic representations only, and they are not intended to imply a particular valve assembly embodiment and/or fabrication technique(s) to the exclusion of others which, in light of the disclosure herein, would be evident to those skilled in the art.

Regardless of the invention embodiment or its fabrication technique(s), impulse tolerance of a valve assembly of the invention results in part from hysteresis heat loss due to compliance of the elastic valve body base plate, as well as from heat loss associated with operation of the nonlinear spring-mass damper. The combined heat loss is reflected in reduction of closing energy impulse amplitude, as well as damping of induced valve body vibrations. Compliance is exhibited by the elastic valve body base plate upon contact of its peripheral valve seat interface with a valve seat during valve closure. This compliance effectively increases the duration of a closing energy impulse. And the increased impulse duration results in narrowing of the corresponding induced vibration spectrum.

The valve body has at least one guide, and at least one peripheral seal-retention groove (typically spaced radially apart from the central internal cavity). When an elastomeric seal is installed in the peripheral groove to complement the valve assembly features described above, valve closing impulse energy which is transmitted from the valve assembly to an associated valve seat and pump housing is less likely to excite vibrations that predispose a pump to early failure. Such vibration reductions, and the associated reductions in metal fatigue and corrosion susceptibility, are especially beneficial in cases where the fluid being pumped is corrosive.

Supplementing the above-described vibration reductions, hysteresis loss within the elastomeric seal can further contribute to the advantages conferred by an impulse tolerant valve assembly of the invention. Heat dissipated within the elastomeric seal subtracts from the total closing impulse energy available to excite destructive vibration. And since the vibration damping characteristics of the impulse tolerant valve assembly can be tailored to more closely match those of the seal, potentially destructive vibration may be doubly damped. More broadly, the nonlinear spring-mass damper of the impulse tolerant valve assembly can be tuned (i.e., adjusted) to work most beneficially with several other components of the pump, such as the elastomeric seal and valve seat, to optimize overall reductions of destructive induced vibration.

An impulse tolerant valve assembly is thus designed to integrate the functions of various valve body and pump structural features with functions of the nonlinear spring-mass damper. See, e.g., U.S. Pat. No. 6,026,776, incorporated by reference. Further, the nonlinear spring-mass damper, acting through shearing forces exerted on a dilatant liquid by flexure of adjacent Belleville springs, dissipates an additional portion of closing impulse energy as heat while damping vibration. The interactions contribute to impulse tolerance of a valve assembly by, for example, creating what has been termed "shear" damping (see, e.g., U.S. Pat. No. 5,670,006, incorporated by reference).

Overall heat loss in the nonlinear spring-mass damper combines with heat loss in the valve body to selectively reduce the amplitude and duration of vibrations that a closing energy impulse would otherwise tend to excite. Heat energy lost (i.e., dissipated) in the nonlinear spring-mass damper during such shearing movement is subtracted from the total closing impulse energy otherwise available to excite destructive flow-induced vibration resonances in the valve, valve seat and/or pump housing. See, e.g., U.S. Pat. No. 5,158,162, incorporated by reference.

A different type of interaction of a nonlinear spring-mass damper with a plurality of spring-supported masses may also contribute to impulse tolerance of a valve assembly. If a plurality of masses within the nonlinear spring-mass damper are not longitudinally fixed but merely guided within the nonlinear spring-mass damper, the (relatively dense) masses may experience a longitudinal movement phase lag with respect to other parts of a valve assembly (analogous in part to the outer ring movement in an automotive elastomeric damper or the antiphase movement of small masses in an automotive pendulum damper). See, e.g., the '776 patent cited above. Different embodiments of the invention employ various combinations of the above mass interactions, in combination with other valve assembly design features described herein, to achieve effective vibration damping at specific frequencies of interest (e.g., pump housing resonant frequencies). Note that the degree of each phase lag characteristic of a particular impulse tolerant valve assembly embodiment may be tuned to pump frequencies of interest in a manner analogous in part to the tuning of automotive vibration dampers in particular piston engine configurations.

Specific desired properties for each nonlinear spring-mass damper component arise from a design concept requiring coordinated functions depending on the location and vibration characteristics of each portion of the valve body surrounding the damper. The nonlinear spring-mass damper immersed in a dilatant liquid aids longitudinal compliance of the valve body because it viscoelastically accommodates longitudinal deformation of the valve body base plate. Hysteresis in the nonlinear spring-mass damper and the valve body as a whole (including, e.g., the elastic valve body base plate) further reduces closing energy impulse amplitude through dissipation of a portion of impulse energy as heat.

Elastic longitudinal compliance of an impulse tolerant valve assembly results in part from elastic properties of the materials comprising the impulse tolerant valve body. Such elastic properties may be achieved through use of composites as, for example, in an elastic valve body base plate comprising steel, carbon fiber reinforced polymer, carbon nanotube reinforced polymer, and/or carbon nanotube reinforced metal matrix. The polymer may comprise a polyaryletherketone (PAEK), for example, polyetheretherketone (PEEK). See, e.g., U.S. Pat. No. 7,847,057 B2, incorporated by reference.

A more detailed consideration of elastic compliance in an impulse tolerant valve assembly is described below. As a closing energy impulse is applied to an impulse tolerant (suction) valve assembly, substantially central longitudinal deformation of the impulse tolerant valve body occurs. And such deformation is associated with elastic bending of the valve body base plate into a concave or bowl-shaped valve body flexure as noted above and further described below. This concave flexure results from internal pumped-fluid pressure acting substantially equally across the valve body transverse plane (i.e., resulting in fluid forces substantially perpendicular to the plane of the elastic valve body base plate), while the valve seat exerts force generally in the opposite direction through the valve seat interface. Since the valve seat interface is peripheral to the valve body base plate, the base plate tends to flex (elastically and generally centrally) while the peripheral valve seat interface is restrained by its contact with the valve seat.

The description of valve body flexure as concave or bowl-shaped refers to a view from the proximal or high-pressure side of the valve body. Such flexure is substantially elastic and may be associated with slight circular rotation (i.e., a circular rolling contact) of the valve body's valve seat interface with the valve seat itself. When the degree of rolling contact is sufficient to justify conversion of the valve seat interface from the traditional frusto-conical shape to a convex curved shape (which may include circular, elliptic and/or parabolic portions), a correspondingly-curved concave valve seat may be used. Such rolling contact, when present, augments elastic formation of the bowl-shaped valve body flexure on the pump pressure stroke, reversing the process on the suction stroke.

The circular rolling contact described herein may be visualized by considering the behavior of the convex valve seat interface as the valve body experiences bowl-shaped flexure (i.e., the transformation from a relatively flat shape to a bowl shape). During such flexure the periphery of the valve seat interface rotates inwardly and translates proximally (relative to the valve body's center of gravity) to become the proximal rim of the bowl-shaped flexure.

While substantially elastic, each such valve body flexure is associated with energy loss from the closing energy impulse in the form of heat due to hysteresis of the valve body. Frictional heat loss (and any wear secondary to friction) associated with any circular rolling contact of the convex valve seat interface with the concave valve seat is relatively low. Thus, the rolling action, when present, minimizes wear that might otherwise be associated with substantially sliding contact of these surfaces. Further, when rolling contact between valve body and valve seat is present during both longitudinal valve body flexure and the elastic rebound which follows, trapping of particulate matter from the pumped fluid between the rolling surfaces tends to be minimized.

In addition to the above-described heat loss associated with hysteresis secondary to flexure in portions of an impulse tolerant valve body (including, e.g., an elastic valve body base plate), hysteresis loss will also occur during pressure-induced movements of components of the nonlinear spring-mass damper (in association, e.g., with valve closure and base plate flexure). Spring flexure and related mass movements will in general be associated with additional hysteresis heat loss. Indeed, the mass itself may be designed to flex under relatively high accelerations as seen, for example, during valve closure. In such embodiments the mass may comprise composites of substantially elastic materials (e.g., carbon fiber and/or aramid fiber) with viscoelastic materials (e.g., polymers or interpenetrating polymer networks). Mass flexure may then occur simultaneously with spring flexure within a nonlinear spring-mass damper, with the potential for beneficial heat loss (and consequent vibration damping) over a range of frequencies.

Another aspect of the formation of a bowl-shaped valve body flexure under the influence of a closing energy impulse is that the momentum of pumped fluid which moves in contact with the valve body is smoothly redirected (at least in part) laterally and proximally by the concave proximal valve body surface. Forces due to oppositely directed radial components of the resultant fluid flow tend to cancel, and energy lost as heat in pumped fluid turbulence is subtracted from that of the closing energy impulse, thus decreasing its amplitude.

Because of the above-described energy loss and the time required for valve body longitudinal deformation to take place, with the associated dissipation of closing impulse energy described above, a closing energy impulse applied to an impulse tolerant valve assembly is relatively lower in amplitude and longer in duration (i.e., having a longer rise time) than an analogous closing energy impulse applied to a conventionally stiff valve body which closes on a conventional frusto-conical valve seat. The combination of lower amplitude and increased duration of the closing energy impulse results in a narrowed characteristic vibration bandwidth having reduced potential for induction of damaging resonances in the valve, valve seat, and adjacent portions of the pump housing. See, e.g., the above-cited '242 patent.

In continuous pump operation, repetitive elastic longitudinal compression and valve body flexure are followed by elastic rebound under the influence of a series of relatively brief closing energy impulses. Cumulative energy loss in the form of heat (e.g., hysteresis loss plus friction loss) is continuously transported for redistribution within the valve body and eventual rejection to the valve body surroundings (including, e.g., the pumped fluid). This heat, which is substantially lost to the valve body surroundings, represents a reduction in the energy content (and thus the damage-causing potential) of the closing energy impulse applied to the valve body.

Note that in describing the behavior of certain polymers herein under elevated heat and pressure, the term "polymer" includes relatively homogenous materials (e.g., a single-species fluid polymer) as well as composites and combination materials containing one or more of such relatively homogenous materials plus finely divided particulate matter (e.g., nanoparticles) and/or other dispersed species (e.g., species in colloidal suspension) to improve heat scavenging and/or other properties. See, e.g., U.S. Pat. No. 6,432,320 B1, incorporated by reference.

For polymers that may be incorporated in a nonlinear spring-mass damper as noted above, optimal damping is associated with relatively high storage modulus and loss tangent values, and is obtained over various temperature ranges in multicomponent systems described as having macroscopically phase-separated morphology, microheterogeneous morphology, and/or at least one interpenetrating polymer network. See, e.g., the above-cited '006 patent and U.S. Pat. Nos. 5,091,455; 5,238,744; 6,331,578 B1; and 7,429,220 B2, all incorporated by reference.

Note also that the impulse tolerant characteristics of a valve body of the invention operate by four interacting mechanisms. First, impulse amplitude is reduced by converting a portion of total closing impulse energy to heat, which is then ultimately rejected to the valve body surroundings (e.g., the pumped fluid). Each such reduction of impulse amplitude means lower amplitudes in the characteristic vibration spectrum transmitted to the pump housing.

Second, impulse duration at the valve seat is lengthened by the cycle time associated with bowl-shaped valve body flexure and elastic rebound. Each such lengthening of impulse duration results in a corresponding reduction of the impulse's characteristic bandwidth (and thus reduction of the damage potential of induced vibrations). In other words, bandwidth narrowing is achieved in embodiments of the invention through an increase of the effective impulse duration due to slowing the impulse's rise time as the valve assembly's components flex and relax over a finite time interval.

Third, induced vibration resonances of the valve body, valve seat, and/or pump housing structures are effectively damped by interactions of portions of the impulse tolerant valve body and nonlinear spring-mass damper with pumped fluid.

And fourth, the potential for excitation of damaging resonances in pump vibration induced by a closing energy impulse is further reduced through narrowing of the impulse's characteristic vibration bandwidth by increasing the valve body's effective inertia without increasing its actual mass. Such an increase of effective inertia is possible because a portion of pumped fluid moves with the valve body as it flexes and/or longitudinally compresses. The mass of this portion of pumped fluid is effectively added to the valve body's mass during the period of flexure/relaxation, thereby increasing the valve body's effective inertia.

To increase understanding of the invention, three embodiments are discussed herein only as illustrative examples. In a first invention embodiment an impulse tolerant valve assembly is described as comprising a valve body which has a longitudinal axis and comprises an elastic valve body base plate and a proximal valve body portion. A valve seat interface is located peripherally on the elastic valve body base plate. A central internal cavity is substantially enclosed by the valve body base plate and the proximal valve body portion, and the valve body has at least one peripheral seal-retention groove and at least one guide. The central internal cavity substantially encloses a nonlinear spring-mass damper.

As shown for example herein, the valve body may have a top guide stem centered on the proximal valve body portion. The nonlinear spring-mass damper may comprise at least one perforated mass and at least two Belleville springs immersed in dilatant liquid. The dilatant liquid may, in turn, comprise mineral oil and nanoparticles.

As noted above, the valve seat interface may have a convex curve to facilitate rolling contact with a valve seat. If it has a convex curve, the valve seat interface may have circular, elliptic and/or parabolic portions to match optionally corresponding portions on a mating valve seat. Such optional matching will tend to reduce wear and improve the rolling seal between valve seat interface and valve seat.

In a second invention embodiment an impulse tolerant valve body has at least one guide, a peripheral seal-retention groove, and a valve seat interface. The valve body substantially encloses an internal cavity, and the internal cavity substantially encloses a nonlinear spring-mass damper. The nonlinear spring-mass damper may be immersed in a dilatant liquid within the internal cavity, and the dilatant liquid may comprise mineral oil, at least one fibrous filler, at least one particulate filler, and/or nanoparticles.

A third invention embodiment is a method of making an impulse tolerant valve assembly, the method comprising two steps. The first step is providing a valve body having at least one guide, a peripheral seal retention groove, a substantially enclosed internal cavity, and a valve seat interface. And the second step is providing a nonlinear spring-mass damper substantially enclosed by said internal cavity. The first and second steps may be augmented by a third (or additional) step of immersing the nonlinear spring-mass damper in a dilatant liquid within said internal cavity for tuning the damper to a plurality of predetermined frequencies. And the dilatant liquid may comprise at least one particulate and/or at least one fibrous filler.

As noted above, various invention embodiments may comprise carbon fiber reinforced polymer, and the polymer may comprise PAEK. In the latter case, the polymer may comprise PEEK. Such an embodiment, combining high strength with flexibility and relatively light weight, demonstrates the beneficial effects described above.

Note that in addition to the example embodiments described herein, still other alternative invention embodiments exist, including valves and pumps comprising one or more of the example embodiments or equivalents thereof. During fabrication, internal valve body spaces may be formed by welding (e.g., inertial welding or laser welding) valve body portions together as in the above-cited '837 patent, or by separately machining such spaces with separate coverings. Valve body fabrication may also be by rapid-prototyping (i.e., layer-wise) techniques. See, e.g., the above-cited '057 patent. A polymeric element may be cast and cured in place in an impulse tolerant valve body as described herein. See, e.g., U.S. Pat. No. 7,513,483 B1, incorporated by reference.

DETAILED DESCRIPTION

Figure 1:
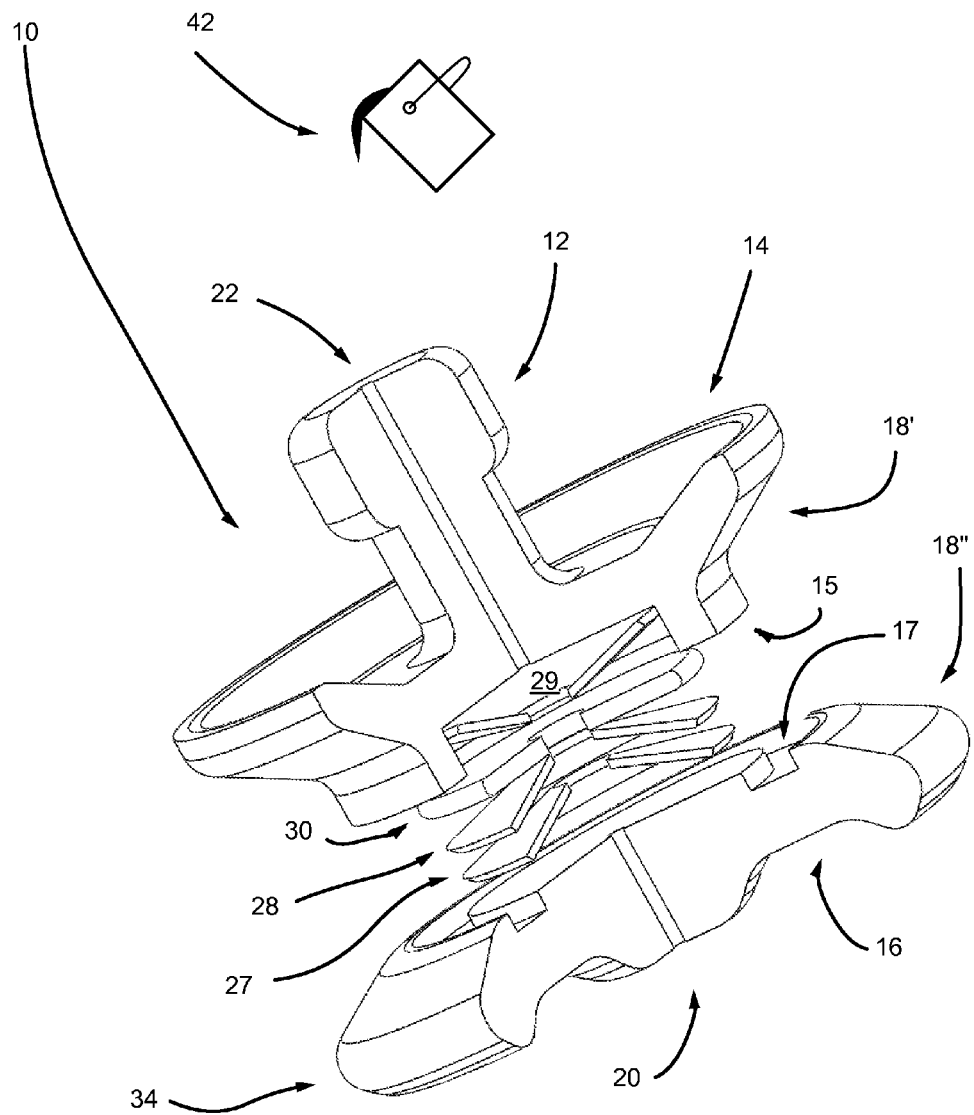
FIG. 1 is a schematic 3-dimensional exploded view of a partially sectioned impulse tolerant valve assembly embodiment. A dilatant liquid is schematically shown being added to a valve body's internal cavity, the cavity being shown as enclosing a tuned vibration damper.
Figure 1:

In the above first invention embodiment, an impulse tolerant valve assembly 10 (see FIGS. 1 and 2) is described as comprising a valve body 14/16 which has a longitudinal axis and comprises an elastic valve body base plate 16 and a proximal valve body portion 14. A valve seat interface 34 is located peripherally on the elastic valve body base plate 16. A central internal cavity 19 (see FIG. 3) is substantially enclosed by the valve body base plate 16 and the proximal valve body portion 14, and the valve body has at least one peripheral seal-retention groove 18 and at least one guide 12. The central internal cavity 19 substantially encloses a nonlinear spring-mass damper 27/28/29/30.

Figure 2:
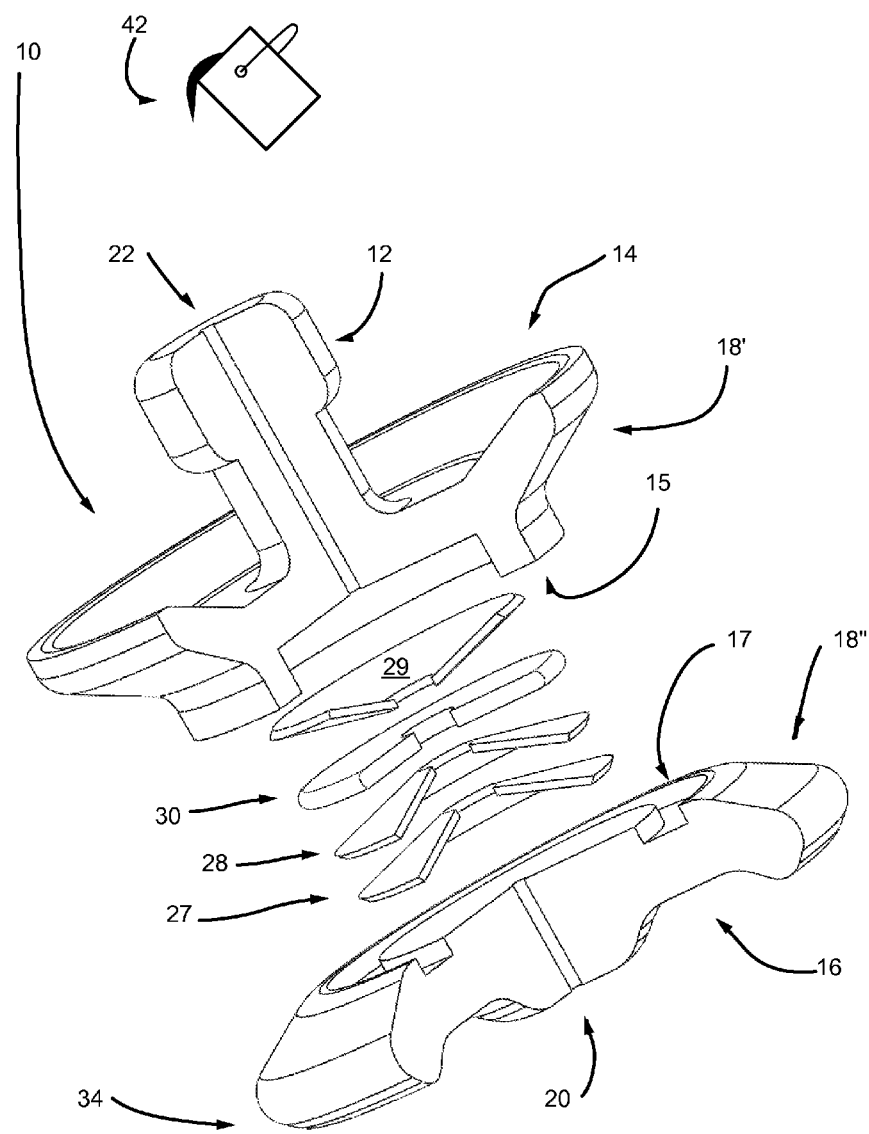
FIG. 2 is a more detailed schematic 3-dimensional exploded view of the partially sectioned impulse tolerant valve assembly of FIG. 1.
Figure 3:
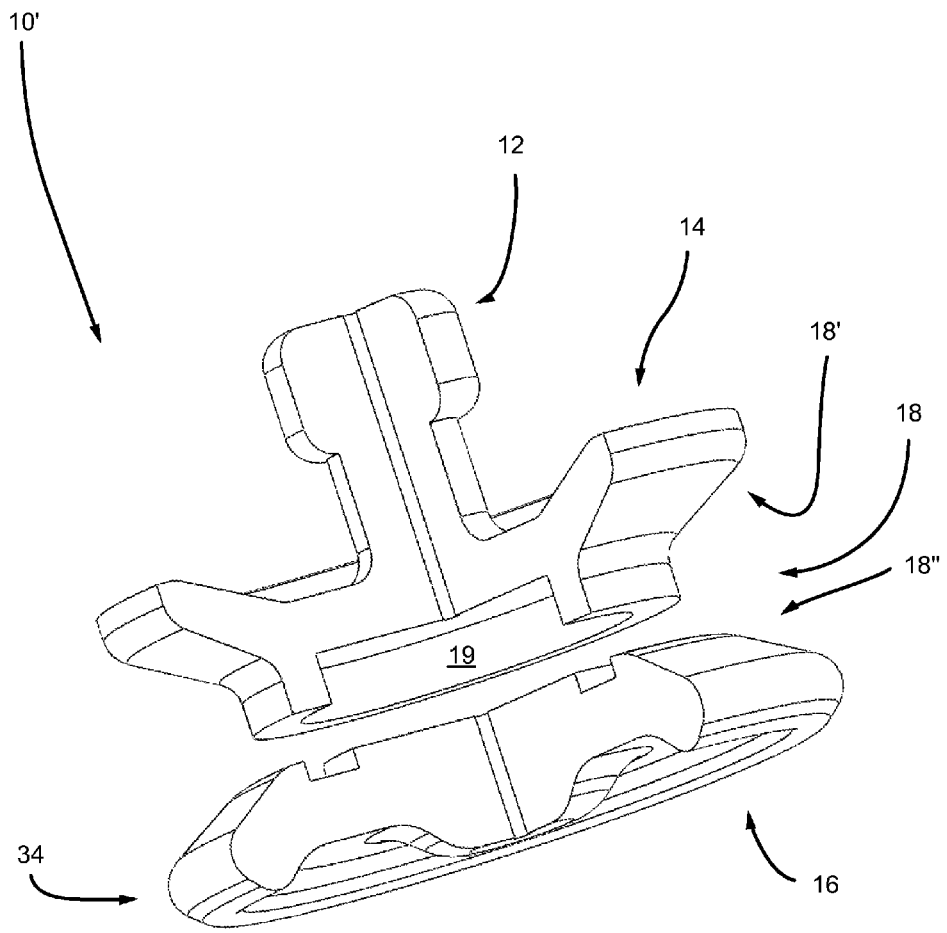
FIG. 3 is a schematic 3-dimensional exploded view of a proximal valve body portion and an elastic valve body base plate. The nonlinear spring-mass damper shown in FIGS. 1 and 2 has been removed in FIG. 3 to more clearly show the valve body's internal cavity.

FIGS. 1 and 2 show schematic exploded views of a nonlinear spring-mass damper 27/28/29/30, which is further described below. Belleville springs 27/28/29 are nonlinear and couple mass 30 to the valve body base plate 16 and the proximal valve body portion 14. Additionally, dilatant liquid 42 (see FIG. 1) is optionally added (via sealable ports 22 and/or 20) to central internal cavity 19 to immerse nonlinear spring-mass damper 27/28/29/30. The nonlinear behavior of dilatant liquid 42 in shear (as, e.g., between Belleville springs 27 and 28) expands the range of tuning the nonlinear spring-mass damper 27/28/29/30 to a larger plurality of predetermined frequencies to reduce "ringing" of valve body 14/16 in response to a closing energy impulse.

Note that valve body 14/16 may be fabricated by several methods, including that schematically illustrated in FIGS. 1 and 2. For example, circular boss 15 on proximal valve body portion 14 may be inertia welded or otherwise joined to circular groove 17 on valve body base plate 16. Such joining results in the creation of peripheral seal-retention groove 18 having proximal groove wall 18' and distal groove wall 18" (see FIG. 3).

In the second invention embodiment described herein an impulse tolerant valve body 10 has at least one guide 12, a peripheral seal-retention groove 18, and a valve seat interface 34. The valve body substantially encloses an internal cavity 19, and the internal cavity substantially encloses a nonlinear spring-mass damper 27/28/29/30. The dilatant liquid 42 that may optionally immerse nonlinear spring-mass damper 27/28/29/30 may comprise mineral oil, at least one fibrous filler, at least one particulate filler, and/or nanoparticles.

A third invention embodiment described herein is a method of making an impulse tolerant valve assembly 10, the method comprising two steps. The first step is providing a valve body 14/16 having at least one guide 12, a peripheral seal retention groove 18, a substantially enclosed internal cavity 19, and a valve seat interface 34. And the second step is providing a nonlinear spring-mass damper 27/28/29/30 substantially enclosed by internal cavity 19. The first and second steps may be augmented by a third (or additional) step of immersing the nonlinear spring-mass damper 27/28/29/30 in a dilatant liquid 42 within internal cavity 19 for tuning the damper to a plurality of predetermined frequencies. And the dilatant liquid may comprise at least one particulate filler and/or at least one fibrous filler.

To clarify the function of nonlinear spring-mass damper 27/28/29/30, mass 30 is shown perforated centrally to provide a passage for flow of dilatant liquid 42 during longitudinal movement of mass 30. This passage is analogous to that provided by each of the Belleville springs 27/28/29 by reason of their washer-like shape.

To enhance scavenging of heat due to friction loss and/or hysteresis loss, liquid polymer(s) 42 may be augmented by adding nanoparticles which are generally invisible to the eye as they are typically dispersed in a colloidal suspension. Nanoparticles comprise, for example, carbon and/or metallic materials such as copper, beryllium, titanium, nickel, iron, alloys or blends thereof. The term nanoparticle may conveniently be defined as including particles having an average size of up to about 2000 nm. See, e.g., the '320 patent.

What is claimed is:

1. An impulse tolerant valve assembly, said valve assembly comprising a valve body having a longitudinal axis and comprising
    an elastic valve body base plate;
    a valve seat interface located peripherally on said elastic valve body base plate;
    a proximal valve body portion;
    a central internal cavity substantially enclosed by said elastic valve body base plate and said proximal valve body portion;
    at least one peripheral seal retention groove; and
    at least one guide;
    wherein said central internal cavity substantially encloses a nonlinear spring-mass damper, said damper having a specific resonant frequency equal to a pump housing resonant frequency.

2. The valve assembly of claim 1 wherein said nonlinear spring-mass damper is immersed in a dilatant liquid within said internal cavity.

3. The valve assembly of claim 2 wherein said nonlinear spring-mass damper comprises at least one perforated mass and at least two Belleville springs.

4. The valve assembly of claim 3 wherein said at least one perforated mass comprises a composite of elastic and viscoelastic components.

5. The valve assembly of claim 4 wherein said dilatant liquid comprises mineral oil.

6. The valve assembly of claim 5 wherein said dilatant liquid additionally comprises nanoparticles.

7. A valve comprising the valve assembly claim 1.

\* \* \* \* \*